US009884685B2

(12) United States Patent
Bartz et al.

(10) Patent No.: US 9,884,685 B2
(45) Date of Patent: Feb. 6, 2018

(54) EXTERNAL CASE HEATER FOR AN ANGLE OF ATTACK SENSOR

(71) Applicant: The Boeing Company, Chicago, IL (US)

(72) Inventors: Gary L. Bartz, Huntington Beach, CA (US); Bryan Galbreath, Orange, CA (US); Julie F. Asfia, Huntington Beach, CA (US); Arthur D. Sandiford, Lake Hughes, CA (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 14/288,891

(22) Filed: May 28, 2014

(65) Prior Publication Data
US 2015/0344137 A1 Dec. 3, 2015

(51) Int. Cl.
*B64D 15/12* (2006.01)
*B64D 15/14* (2006.01)
*G01P 13/02* (2006.01)

(52) U.S. Cl.
CPC .............. *B64D 15/12* (2013.01); *B64D 15/14* (2013.01); *G01P 13/025* (2013.01)

(58) Field of Classification Search
CPC ....... B64D 15/12; B64D 15/22; G01P 13/025; G01P 13/02; H05B 2214/02
USPC .......................... 219/201; 244/134 R; D10/67
See application file for complete search history.

(56) References Cited

U.S. PATENT DOCUMENTS

| | | | | |
|---|---|---|---|---|
| 4,292,503 A | * | 9/1981 | Brent | H05B 3/58 219/535 |
| 4,875,644 A | * | 10/1989 | Adams | B64D 15/163 244/134 D |
| 5,025,661 A | * | 6/1991 | McCormack | G01L 19/0007 73/180 |
| 5,062,869 A | * | 11/1991 | Hagen | G01P 5/165 96/420 |
| 5,302,810 A | * | 4/1994 | Gauthier | B29C 35/02 219/209 |
| 5,438,865 A | | 8/1995 | Greene | |
| 5,586,896 A | * | 12/1996 | Casey | H01R 27/00 439/218 |
| 5,959,828 A | * | 9/1999 | Lewis | F16L 25/01 361/212 |

(Continued)

FOREIGN PATENT DOCUMENTS

EP          1319 863          6/2003

OTHER PUBLICATIONS

Extended European Search Report from Application No. EP 15165557.8 dated Jun. 22, 2015.

*Primary Examiner* — Tu B Hoang
*Assistant Examiner* — Erin McGrath
(74) *Attorney, Agent, or Firm* — Miller, Matthias & Hull LLP

(57) ABSTRACT

A heating apparatus for use in an AoA sensor is described herein. The heating apparatus includes a heating element bonded to a support element. The support element is configured to be attachable to and removable from the AoA sensor. The heating element may receive an electrical current, causing the temperature of the heating element to increase. The temperature increase is designed to reduce the probability that ice forms in certain locations of the AoA sensor.

18 Claims, 8 Drawing Sheets

(56) References Cited

U.S. PATENT DOCUMENTS

| | | | |
|---|---|---|---|
| 6,211,494 B1 * | 4/2001 | Giamati | B64C 1/1453 |
| | | | 219/201 |
| 6,414,282 B1 * | 7/2002 | Ice | G05D 23/1913 |
| | | | 219/209 |
| 2003/0110852 A1 * | 6/2003 | Golly | B64D 43/02 |
| | | | 73/180 |

* cited by examiner

EXTERNAL CASE HEATER FOR AN ANGLE OF ATTACK SENSOR

BACKGROUND

An aircraft may use one or more sensors to determine the aircraft's angle of attack (AoA). To measure the AoA, an aircraft may have a sensor mounted to the outside of the aircraft. The sensor may be used to measure localized airstream angle with respect to a fuselage horizontal reference plane or a wing reference plane. Some sensors use a rotatable appendage affixed to the sensor. The rotatable appendage may have a profile that causes the appendage to seek a neutral or zero angle with respect to the direction of the local airstream around the appendage. As the direction of the local airstream changes, the rotatable appendage preferable rotates to maintain the zero angle with respect to the local airstream around the appendage.

The amount of rotation of the appendage may be detected by the AoA sensor. The sensor, or other cooperative systems, uses the rotation of the appendage to determine the direction of local airflow around the appendage. The angular difference between the direction of local airflow and the horizontal reference plane of the aircraft is the AoA. Because at least a part of the AoA sensor is exposed to the environment, the sensor may experience technical issues as a result of environment effects.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a heating apparatus for use on an AoA sensor is described. The heating apparatus includes a support element configured for releasable engagement with the AoA sensor, a heating element bonded to the support element to form a composite structure, and a control thermostat configured to receive a temperature input and allow current to flow through a resistive element at or below a first temperature and reduce current flow through the resistive element at or above a second temperature.

According to another embodiment, an AoA sensor system for an aircraft is described. The AoA sensor includes an airfoil-shaped body affixed to a rotatable mount, the rotatable mount rotatably affixed to the AoA sensor, and a heating apparatus removably affixed to the AoA sensor and configured to reduce ice formation on the AoA sensor. The heating apparatus includes a support element configured for releasable engagement with the AoA sensor, a heating element bonded to the support element to form a composite structure, and a control thermostat configured to receive a temperature input and allow current to flow through a resistive element at or below a first temperature and reduce current flow through the resistive element at or above a second temperature.

According to a further embodiment, a method for heating an AoA sensor is described. The method includes receiving an input of a temperature of a surface of the AoA sensor, in response to detecting that the temperature is at or below a first temperature set point, allowing current to flow through a heating element of a heating apparatus in thermal contact with the AoA sensor, the heating apparatus abutted to an inner surface of a faceplate of the AoA sensor, and the heating element bonded to a support element of the heating apparatus, and in response to detecting that the temperature is at or above a second temperature set point, reducing current flow through the heating element.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to a heating apparatus for an AoA sensor. In some configurations, the heating apparatus may be removably affixed to an outer casing of an AoA sensor to reduce the probability of ice formation in certain areas of the AoA sensor. The heating apparatus includes a conductive heating element bonded to at least a portion of a support element. In some configurations, the heating element can be formed from one or more layers of a polymer. The heating apparatus can further include an electrical system to provide power to the heating element. The heating apparatus may be installed at a location to reduce the probability of ice formation in an area between an airfoil-shaped body of the AoA sensor and its faceplate.

In some configurations, an airfoil-shaped body may be installed on a rotatable mount (sometimes referred to as a slinger). To allow the free rotation of the airfoil-shaped body, there may be one or more bearing structures in the interface between the rotatable mount and the other components of the AoA sensor. In certain conditions, water may be present in the interface between the rotatable mount/ airfoil-shaped body and other components of the AoA sensor, including the faceplate to which the rotatable mount and airfoil-shaped body are in close proximity to. Under certain weather conditions, the water present in the interface may freeze, preventing the free rotation of the rotatable mount. Because of the location of ice formation, a case heater and an airfoil heater may be ineffective in increasing the temperature of components proximate to the interface. The presently disclosed heating apparatus may be installed in a location suitable to increase the temperature.

Figure 1:
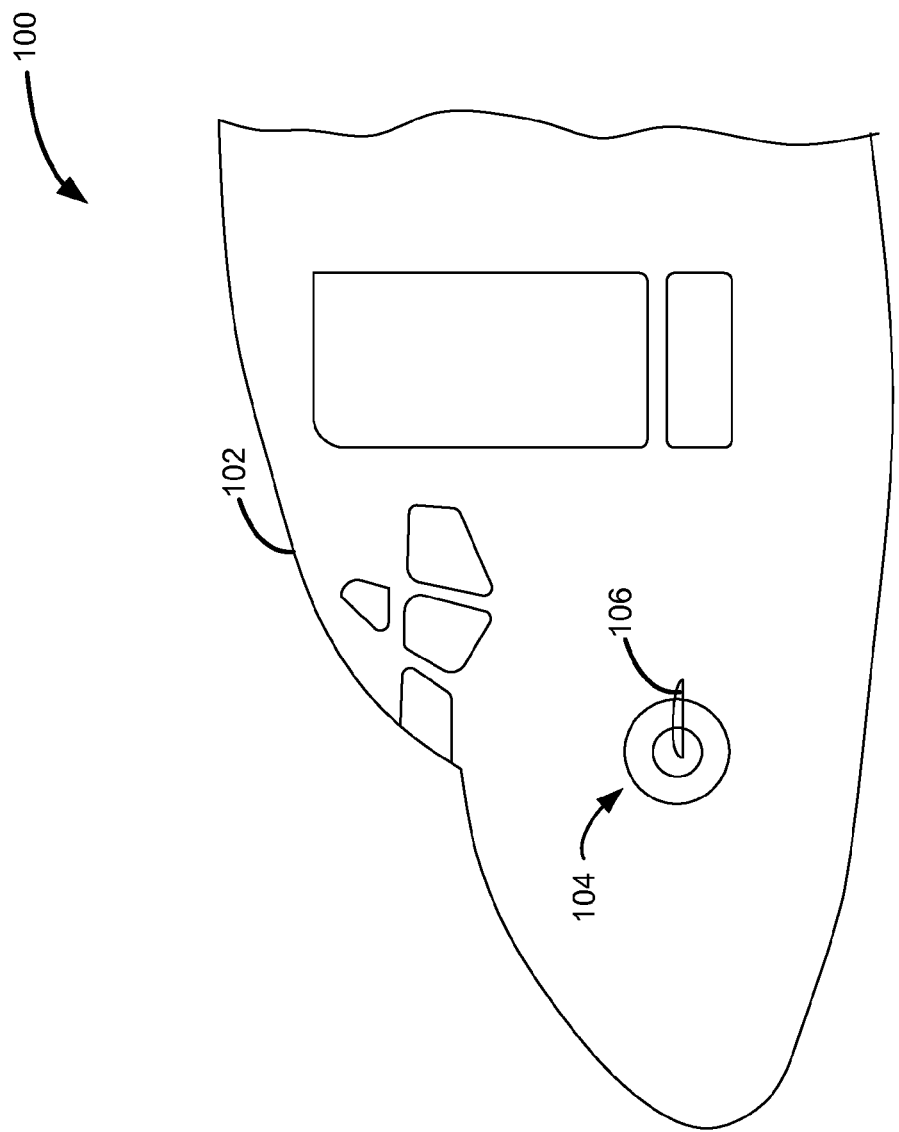
FIG. 1 is a side view of an aircraft in which an AoA sensor has been affixed according to at least one embodiment disclosed herein.

FIG. 1 is a side view of an aircraft 100 in which an AoA sensor 104 has been affixed according to at least one embodiment disclosed herein. The AoA sensor 104 includes an airfoil-shaped body 106 that is rotatable. The airfoil-shaped body 106 is configured to rotate in response to the effects of air moving across the surface of the airfoil-shaped body 106. Preferably, the airfoil-shaped body 106 maintains a zero degree angle in relation to the direction of airflow.

A zero degree angle means that the airfoil-shaped body 106 is parallel, or nearly parallel, to the direction of airflow moving across the airfoil-shaped body 106. When the direction of airflow across the AoA sensor 104 changes, preferably, the airfoil-shaped body 106 will rotate to maintain or achieve a zero degree angle in relation to the direction of the airflow. The angle of rotation of the airfoil-shaped body 106 is measured and used to determine the angle of attack for the aircraft 100.

Portions of the AoA sensor 104, including the airfoil-shaped body 106, may be exposed to the environment. In some instances, water may seep into various portions of the AoA sensor 104. If water is able to seep into certain areas in the AoA sensor 104, the ability of the airfoil-shaped body 106 to rotate may be impeded if the water freezes. If ice forms in certain locations, in response to a change in the direction of airflow across its surface, the airfoil-shaped body 106 may rotate at a slower speed, and may not rotate at all. Thus, the AoA sensor 104 may output an incorrect angle of attack. To reduce the probability of ice formation, a heating apparatus may be used.

Figure 2:
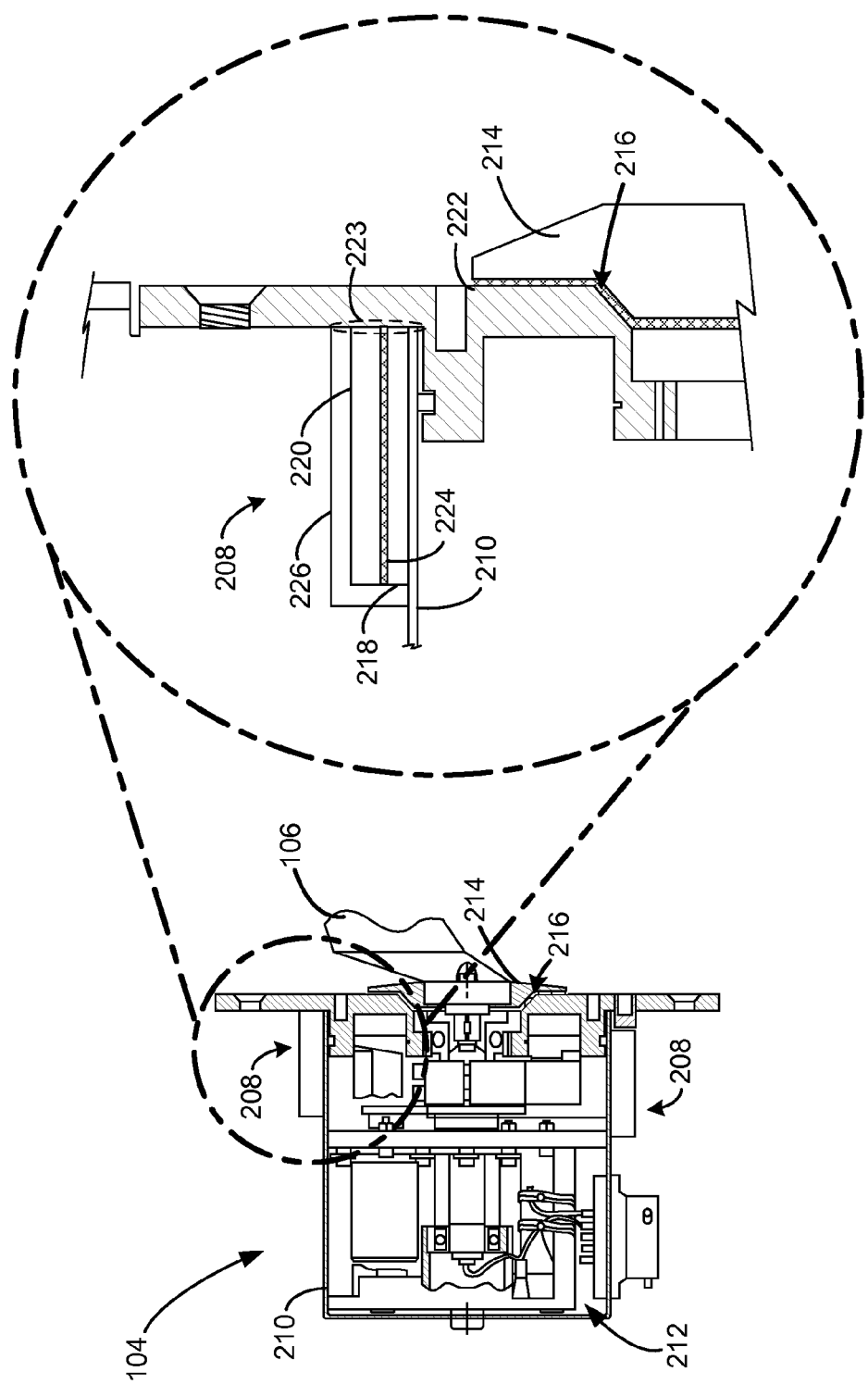
FIG. 2 is a cross-sectional view of an AoA sensor using a heating apparatus to maintain the temperature of a portion of the sensor according to at least one embodiment disclosed herein.

FIG. 2 is a cross-sectional view of the AoA sensor 104 using a heating apparatus 208 to maintain the temperature of a portion of the AoA sensor 104 according to at least one embodiment disclosed herein. The AoA sensor 104 includes outer casing 210. The outer casing 210 is configured to enclose an inner volume 212 of the AoA sensor 104. The inner volume 212 is defined by the inner surface of the outer casing 210. In some configurations, the inner volume 212 is used to enclose and protect various electrical and mechanical componentry of the AoA sensor 104 from the environment. But, some portions of the AoA sensor 104 are exposed to the environment.

As mentioned above, the airfoil-shaped body 106 is exposed to the outside airflow. The airfoil-shaped body 106 is affixed to a rotatable mount 214. In some configurations, the rotatable mount 214 does not sit flush, or abut, the AoA sensor 104, leaving a space 216 between the rotatable mount 214 and the AoA sensor 104. An example of the space 216 is illustrated using a cross hatch pattern. In some configurations, water can enter the space 216 and freeze, impeding the rotation of the rotatable mount 214.

To reduce the probability of ice formation in the space 216 and other possible locations, the heating apparatus 208 may be used. The heating apparatus 208 includes a support element 218 and a heating element 220. The heating element 220 may be a resistive element that, when a certain amount of current is applied, generates heat. The heating apparatus 208 surrounds at least a portion of the outer casing 210. The heating apparatus 208 preferably is in direct contact with the outer casing 210. Heat generated by the heating apparatus 208 is configured to raise the temperature of the outer casing 210 and the faceplate 222.

The heat from the outer casing 210 preferably raises the temperature of the face plate 222 of the AoA sensor 104. The increase in temperature of the faceplate 222 preferably reduces the probability that ice will form in the space 216 between the faceplate 222 and the rotatable mount 214. The reduction of the probability of the buildup of ice can increase the reliability and accuracy of the AoA sensor 104. In some configurations, increased heat transfer may be provided by abutting the heating apparatus 208 to an inner surface 223 of the faceplate 222.

The support element 218 of the heating apparatus 208 may be used to provide structural support to the heating apparatus 208. In some configurations, the heating apparatus 208 is securely affixed to the outer casing 210. To achieve a level of securement that may be required, the heating apparatus 208 may have a level of rigidity able to withstand the forces of securement. Further, it may be necessary that the heating apparatus 208 has a level of rigidity able to withstand forces, especially vibrational forces, experienced during the operation of the aircraft 100. The support element 218 may be, in a configuration, a metal collar.

Further, the support element 218 may provide a substrate upon which the heating element 220 is affixed. In some configurations, the heating element 220 is manufactured from one or more polymeric components. For example, the heating element 220 may be formed from one or more "polymer blacks," e.g. polyacetylene, polypyrrole, polyaniline, p-phenylene vinylene, and their copolymers. In some configurations, the heating element 220 is a polymeric material with a suitable amount of conductive substance, such as carbon black, added to the polymeric material to achieve a desired level of conductivity. In other configurations, the heating element 220 may be a metallic-based heating element that uses a metallic conducting element, such as copper, silver, gold, or aluminum, to act as the conductor in the heating element 220.

In some configurations, the heating element 220 is affixed or bonded directly to the support element 218 using a bonding agent 224 to form a composite structure configured to act as an electrical heating element. The bonding agent 224 may be any suitable material for bonding the heating element 220 to the support element 218. For example, the bonding agent 224 may be a polyimide adhesive. The bonding agent 224 may be activated and cause the heating element 220 to be bonded to the support element 218 using various processes, including the use of an autoclave. Although the presently disclosed subject matter is not limited to any particular benefit, in one configuration, a polyimide adhesive may be beneficial because of the general characteristics of polyimide adhesives. Some characteristics include a relatively good thermal stability, a low dielectric constant, and a relatively high level of chemical resistivity.

The heating apparatus 208 may also include insulation 226. The insulation 226 may be configured to reduce the amount of heat lost from the heating apparatus 208 into the environment, and increase the amount of heat transferred to various locations of the AoA sensor 104, such as the face plate 222. The insulation 226 may be formed from appropriate, thermally insulative materials. For example, and not by way of limitation, the insulation 226 may be formed from a heat reflective metal, ceramic, glass fiber sheet/matting, silica, mica, glass wool, asbestos, silk wool, and thermally insulative polymers.

Figure 3:
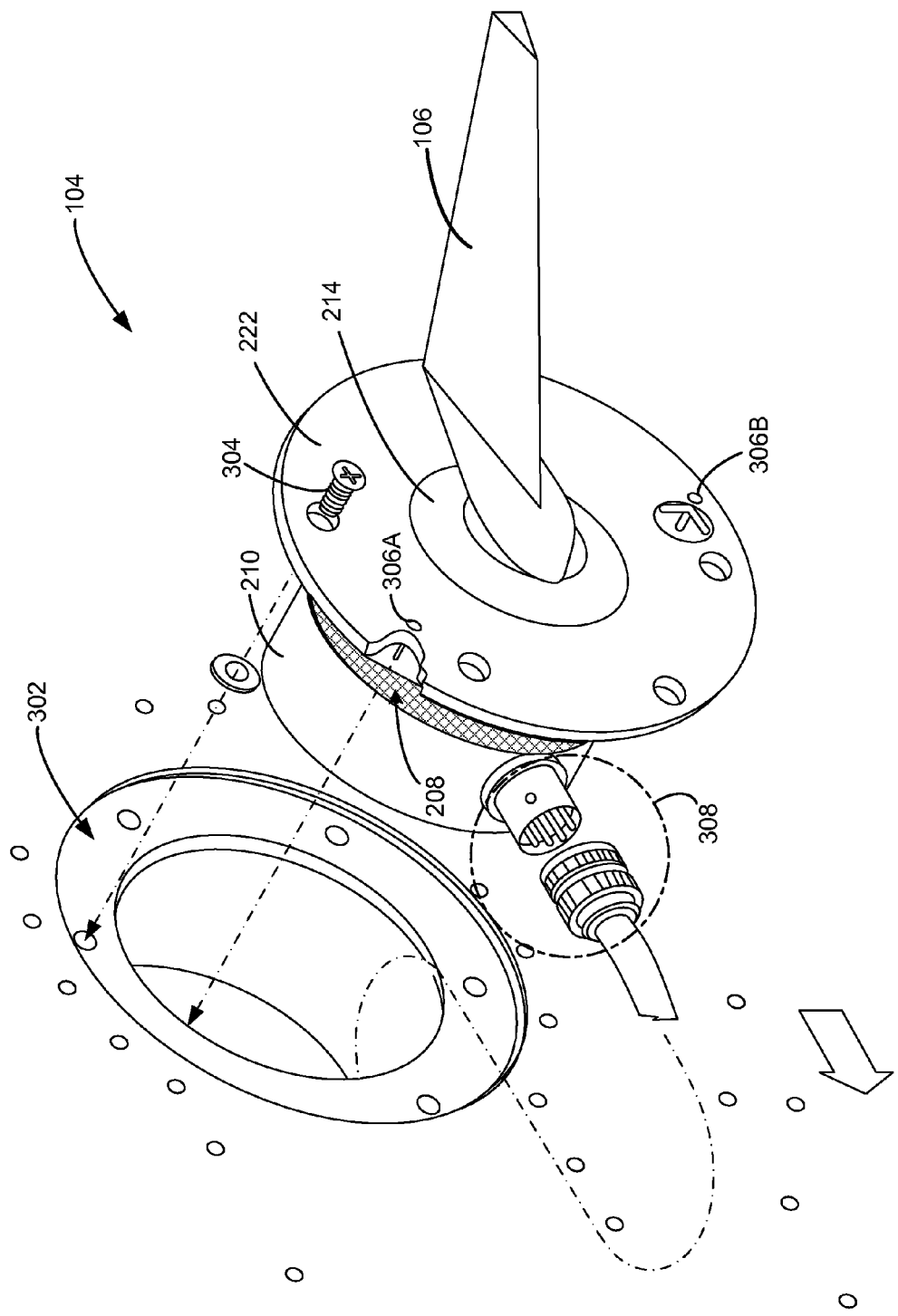
FIG. 3 is an exploded perspective view of an AoA sensor according to at least one embodiment disclosed herein.

FIG. 3 is an exploded perspective view of the AoA sensor 104 according to at least one embodiment disclosed herein. The AoA sensor 104 includes the airfoil-shaped body 106 affixed to the rotatable mount 214. The rotatable mount 214 is rotatably affixed to the faceplate 222. The faceplate 222 is removably cooperatively affixed to a sensor receiving area 302 of the aircraft 100. In one configuration, the faceplate 222 is sized to fit within the sensor receiving area 302 to provide a flush mount for the AoA sensor 104. The faceplate 222 may be affixed to the sensor receiving area 302 using screws, such as the screw 304. The faceplate may be aligned to the sensor receiving area 302 using index pins 306A and 306B. Power to, and data to and from, various components of the AoA sensor 104 may be provided by electrical connector 308.

Figure 4:
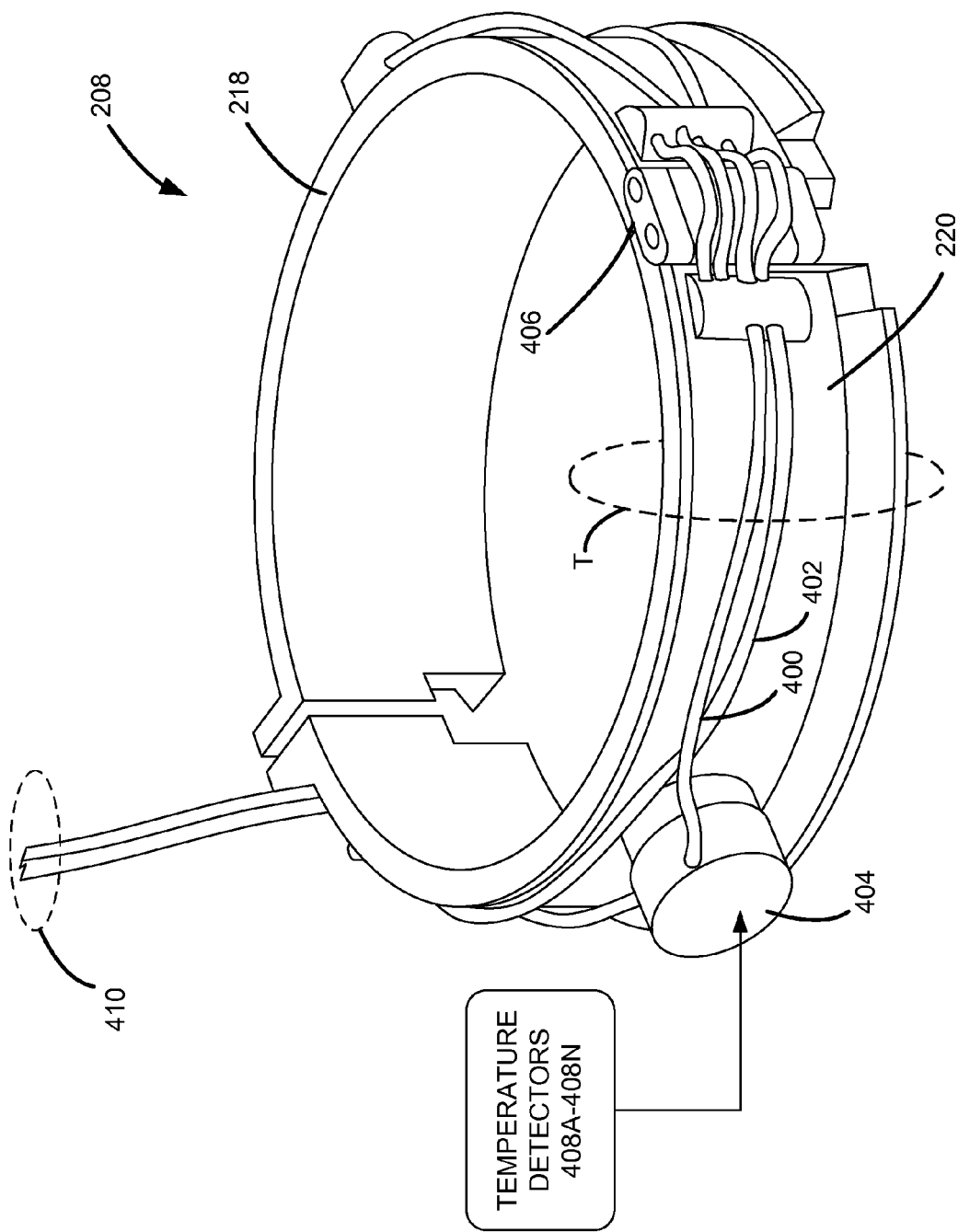
FIG. 4 is a perspective view of a heating apparatus according to at least one embodiment disclosed herein.

FIG. 4 is a perspective view of the heating apparatus 208 according to at least one embodiment disclosed herein. The heating apparatus 208 includes a support element 218 and a heating element 220. The heating element 220 is disposed around at least a portion of the support element 218. The support element 218, along with the heating element 220, may be removably installed on the AoA sensor 104.

The heating element 220 may be a resistive, or Joule, heating element. A resistive heating element creates heat when current is passed through the resistive heating element. The resistance of the resistive heating element causes heat to be generated. In addition to the materials discussed above, the heating element 220 may also be constructed from materials such as nichrome, resistive wire or braid, etched foil, ceramics such as molybdenum disilicide, and composite heating elements. It should be understood, though, that other materials may be used and are considered to be within the scope of the present disclosure. Further, it should be understood that the present disclosure is not limited to resistive heating elements, as other types of heating elements may be used and are considered to be within the scope of the present disclosure.

The heating element 220 may receive electrical power through electrical wires 400 and 402. The wires 400 and 402 may provide an electrical path from an electrical source to provide current to the heating element 220. The electrical current may be controlled in various ways to increase or decrease the temperature of the heating element 220. For example, a control thermostat 404 may be used. The control thermostat 404 may be configured to detect the temperature of the heating element 220.

At or below a first temperature set point, the control thermostat 404 may close a previously open switch (not shown) internal to the control thermostat 404. Closing the switch may cause the formation of a closed loop, allowing current to flow through the wires 400 and 402. At or above a second temperature set point, the control thermostat 404 opens the switch, preventing or reducing the flow of current through the wires 400 and 402. Thus, the temperature of the heating element 220 may be controlled by the control thermostat 404. In some configurations, the first temperature may be a temperature to reduce ice formation. In other configurations, the second temperature may be a temperature to prevent damage to the AoA sensor 104.

In some configurations, the control thermostat 404 may operate as a type of proportional-integral-derivative (PID) controller. A PID controller calculates an "error" value as the difference between a measured process variable and a desired set point. The controller attempts to minimize the error in outputs by adjusting the process control inputs. Thus, if the control thermostat 404 is a PID controller, instead of an "off or on" functionality, the control thermostat may incrementally increase or incrementally decrease the current flow to the heating element 220 to maintain a temperature.

The control thermostat 404 may receive the temperature input from temperature detectors 408A-408N (hereinafter collectively referred to as the "temperature detectors 408"). The temperature detectors 408 may be one or more devices that sense a temperature at a location in the AoA sensor 104 or the heating apparatus 208, or both. The temperature detectors 408 are further configured to provide a temperature output to the control thermostat 404. The control thermostat 404 is configured to receive the temperature output. The temperature detectors 408 may be located in various locations to provide a range of temperature inputs to the control thermostat 404. In some configurations, the control thermostat 404 may have internal temperature detectors 408. In other configurations, the temperature detectors 408 may be external to the control thermostat 404 and placed in various locations.

The heating apparatus 208 may receive power through electrical leads 410. The electrical leads 410 may introduce various types of power into the heating apparatus 208. In some configurations, the heating apparatus 208 is provided power in an independent manner from the AoA sensor 104. For example, the heating apparatus 208 may be part of an aircraft's Air Data Heat System. The Air Data Heat System may also control and power the AoA sensor 104 in an independent manner from the heating apparatus 208. Power may be provided to the heating apparatus 208 either manually or automatically. For example, the heating apparatus 208 may be activated by the flight crew per a checklist, or automatically (independent of manual activation or deactivation) by other airplane means, such as when the flight crew activates the engine's fuel switches. The heating apparatus 208 may be secured around the AoA sensor 104 using a hinge 406, illustrated in further detail in FIG. 5. An additional configuration of the heating apparatus 208 is shown in a cross-sectional view in FIG. 7 taken across plane T of FIG. 4.

Figure 5:
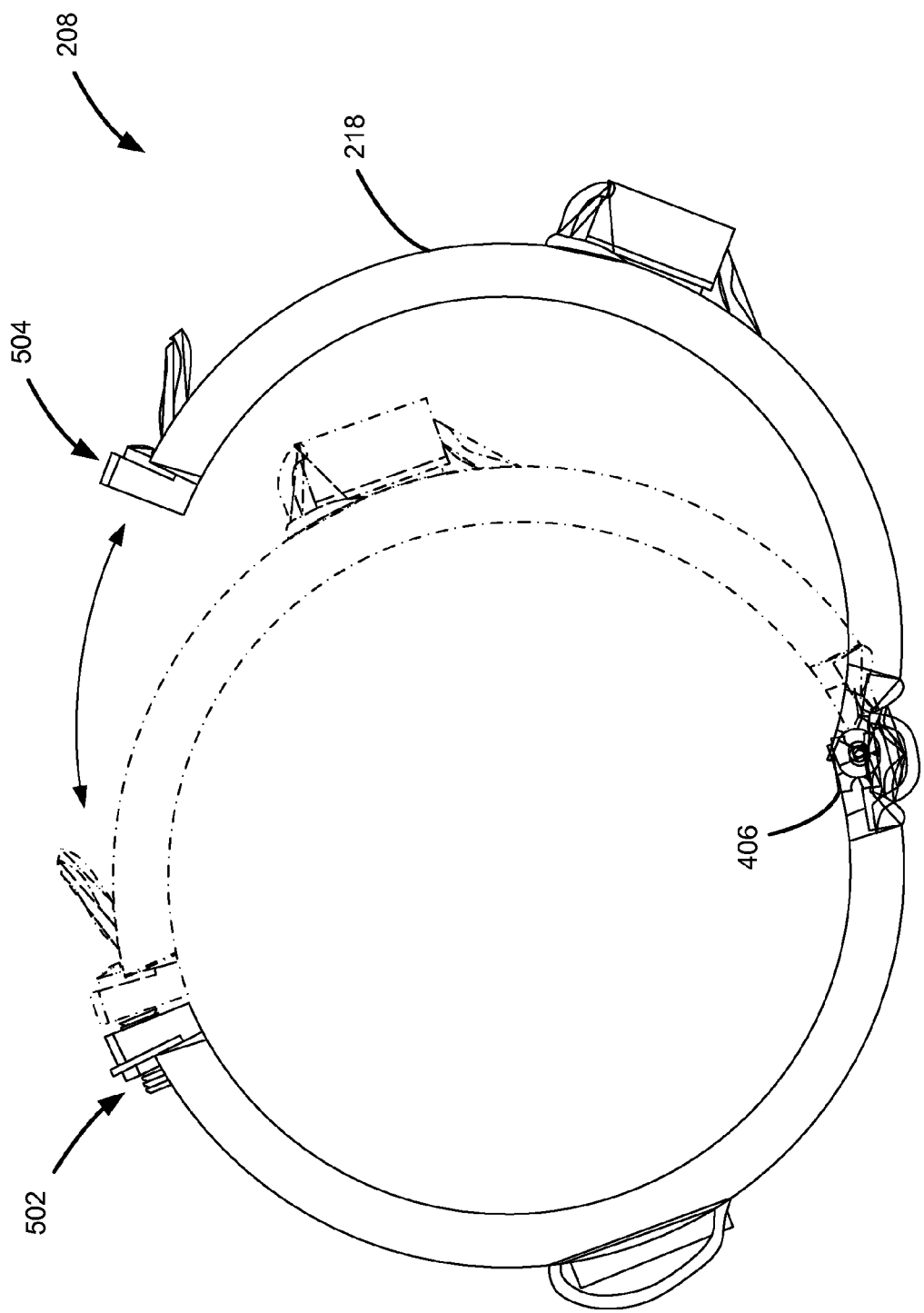
FIG. 5 is a bottom view of a heating apparatus in an open configuration according to at least one embodiment disclosed herein.

FIG. 5 is a bottom view of the heating apparatus 208 in an open configuration according to at least one embodiment disclosed herein. The support element 218 of the heating apparatus 208 has been opened using the hinge 406. The hinge 406 provides a point of rotation to which a first end 502 of the support element 218 and a second end 504 of the support element. The space provided by the separation may be used to place the heating apparatus 208 onto the outer casing 210 of the AoA sensor 104. The first end 502 may be releasably affixed to the second end 504 through the use of a fastener, illustrated in further detail in FIG. 6.

Figure 6:
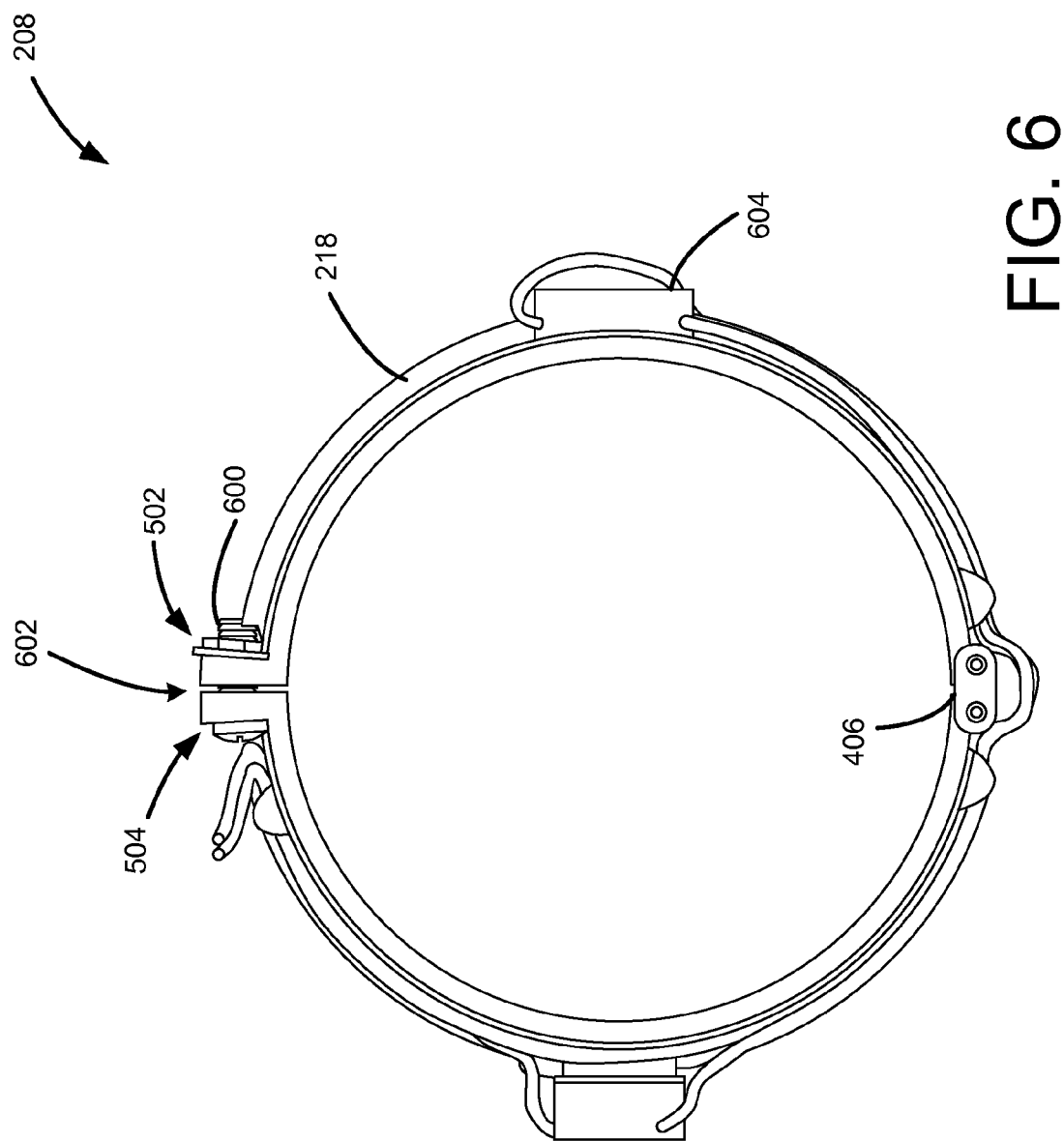
FIG. 6 is a top view of a heating apparatus in a closed configuration according to at least one embodiment disclosed herein.

FIG. 6 is a top view of the heating apparatus 208 in a closed configuration according to at least one embodiment disclosed herein. In the closed configuration illustrated in FIG. 6, the first end 502 is releasably affixed to the second end 504 using a fastener 600. The fastener 600 may be constructed in any manner suitable to secure the first end 502 to the second end 504. It should be understood that other configurations of the presently disclosed subject matter may forego the use of the fastener 600. For example, the hinge 406 may be a spring-loaded hinge designed to exert a closing force on the support element 218 of the heating apparatus 208.

In some configurations, it may be desirable or necessary to provide a means to indicate that the heating apparatus 208 has been secured affixed to the outer casing 210 of the AoA sensor 104. When affixing the heating apparatus 208 to the AoA sensor 104, a technician may use the fastener 600. To assist in installation, in some configurations, when installed, the heating apparatus 208 has void 602 defined by the area between the first end 502 and the second end 504. The void 602 may be used as an indicator that the heating apparatus 208 is fully installed on the AoA sensor 104. The absence of the void 602 may indicate that the inner diameter of the heating apparatus 208 is too large for the AoA sensor 104 and, thus, may extricate from the AoA sensor 104. The absence of the void 602 may also indicate an over-tightening of the heating apparatus 208, possibly indicating damage to the outer casing 210.

FIG. 6 also illustrates a fuse 604. In some configurations, the fuse 604 may fault or open in various situations. For example, the fuse 604 may open in an overcurrent or over-temperature condition. In one example, the fuse 604 may open in the event the control thermostat 404 fails closed. If the control thermostat 404 fails closed, there may be no means of heater shutoff. In this example, therefore, the fuse 604 may provide a means to prevent the over-temperature condition.

Figure 7:
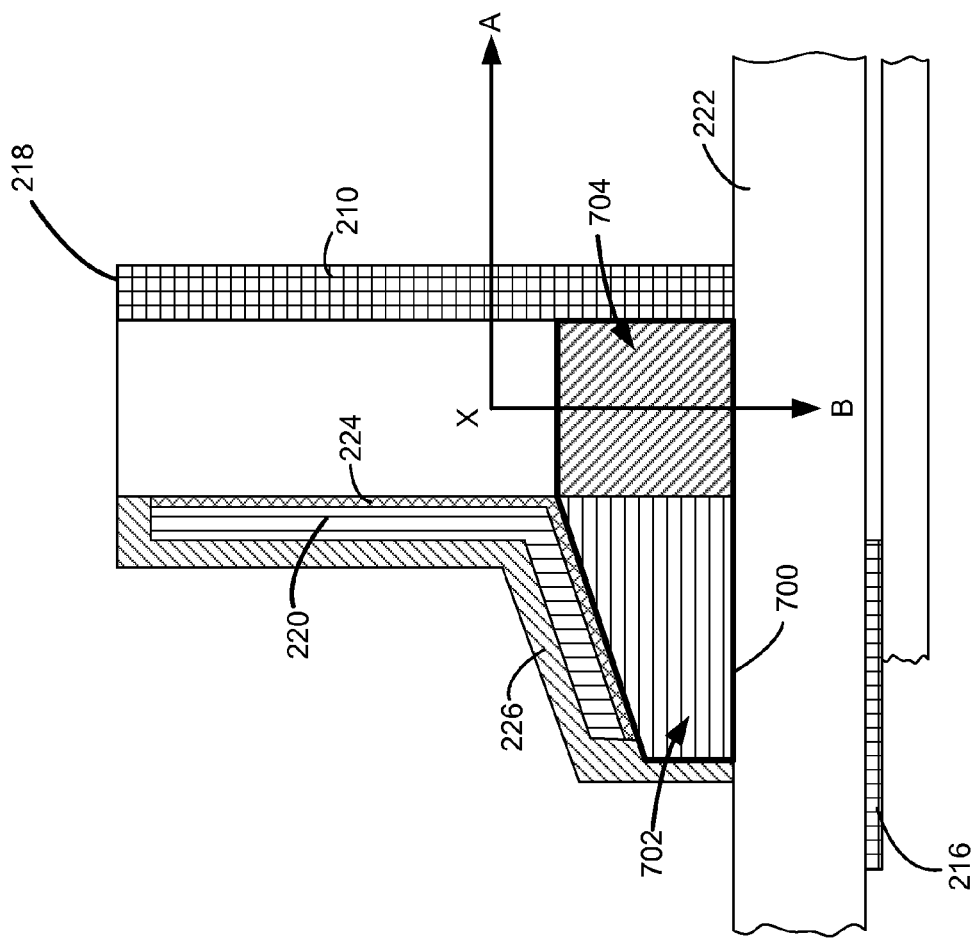
FIG. 7 is a cross-sectional view of a portion of a heating apparatus according to at least one embodiment disclosed herein.

FIG. 7 is a cross-sectional view of a portion of the heating apparatus 208 taken across the plane T illustrated in FIG. 4 according to at least one embodiment disclosed herein. The heating apparatus 208 includes the support element 218, the heating element 220 disposed proximate to an outer surface of the heating apparatus 208, and the insulation 226 installed around at least a portion of the heating apparatus. In some examples, a bonding agent may be used to affix the heating element 220 to the support element 218, such as the bonding agent 224. At least a portion of the support element 218 abuts a portion of the outer casing 210. In some examples, the surface of the support element 218 in contact with the outer casing may have a smooth or semi-smooth finish to provide a better heat transfer interface.

It may be preferable to increase the heat density at certain locations. For example, the heat generated by the heating element 220 may be transferred to the support element 218 and may flow in two general directions: radially in the direction of X→A and laterally in the direction of X→B. If the total heat generated by the heating element 220 flows primarily in the direction X→A, the temperature of the inner volume 212 of the AoA sensor 104 may be affected, while the temperature of the space 216 (a location for possible ice formation) may be effected in an amount unsuitable to reduce the probability of ice formation. In a different manner, if the total heat generated by the heating element 220 flows primarily in the direction X→B, the temperature of the space 216 may be affected in a suitable amount, thus reducing the probability of ice formation.

To increase the amount of heat flow towards the space 216, the support element 218 may include a flange 700 having a radial portion 702 and a lateral portion 704. The flange 700 may abut the inner surface 223 of the face plate 222, as illustrated in FIG. 2, above. The lateral portion 704 in combination with the radial portion 702 of the flange 700 may present a larger heat transfer surface area for the transfer of heat to space 216 than would otherwise be present without lateral portion 704 of the flange 700. The larger heat transfer surface area may increase the heat flow generated by the heating element 220 in the lateral direction X→B towards the inner surface of the face plate 222. The increased heat flow may "focus" the heat generated by the heating element 220 towards an area of concern, such as the space 216, rather than other areas of less concern, such as the inner volume 212 of the AoA sensor 104. In some configurations, to further increase the heat flow into the flange 700, a portion of the heating element 220 may be disposed on the flange 700.

Figure 8:
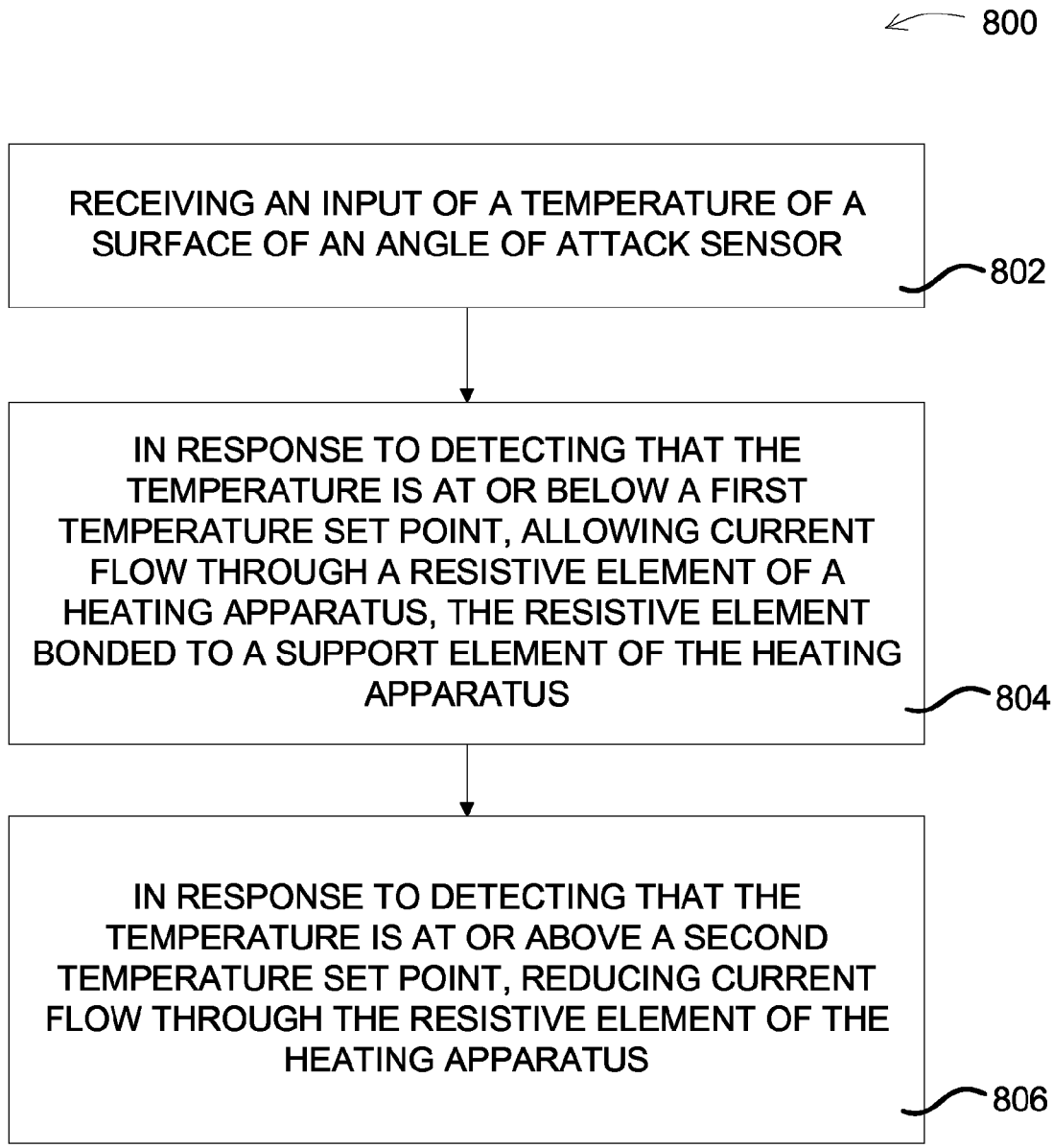
FIG. 8 is a flow diagram illustrating a routine for operating an AoA sensor heating apparatus according to at least one embodiment disclosed herein.

FIG. 8 illustrates one configuration of a routine 800 for operating an AoA sensor heating apparatus according to at least one embodiment disclosed herein. Unless otherwise indicated, more or fewer operations may be performed than shown in the figures and described herein. Additionally, unless otherwise indicated, these operations may also be performed in a different order than those described herein.

The routine 800 commences at operation 802, where an input of a temperature of a surface of an AoA sensor is received. In some configurations, the temperature may be received directly by the control thermostat 404 via direct thermal contact. In other configurations, the temperature may be received by external temperature detectors 408. The surface may be one of several surfaces monitored in the AoA sensor 104. In some configurations, the one or more surfaces are selected based on the probability that conditions conducive to ice formation can be detected at the one or more surfaces. In some configurations, the temperature may be a space surrounding one or more components of the AoA sensor 104. The temperatures may be detected using the temperature detectors 408. The detected temperature may be outputted to the control thermostat 404, which may receive the temperature output as an input.

The routine 800 continues to operation 804, where in response to detecting that the temperature is at or below a first temperature set point, allowing current to flow through a resistive element of a heating apparatus, the resistive element bonded to a support element. In some configurations, the resistive element may be the heating element 220 of the AoA sensor 104. In other configurations, the support element may be the support element 218 of the AoA sensor 104. The first temperature may be a temperature to reduce ice formation.

The routine 800 continues to operation 806, where in response to detecting that the temperature is at or above a second temperature set point, reducing current flow through the resistive element of the AoA sensor 104. The second temperature may be a temperature to prevent damage to the AoA sensor 104. The routine thereafter ends.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:
1. An angle of attack sensor, comprising:
a rotatable mount;
an airfoil-shaped body coupled to the rotatable mount;
an outer casing defining an inner volume;
a faceplate extending over the outer casing and configured to partially receive the rotatable mount, wherein a space is defined between the rotatable mount and an outer surface of the faceplate; and
a heating apparatus disposed in the inner volume of the outer casing, and including:
a support element coupled to the outer casing, at least a portion of the support element abutting a portion of the outer casing;
a heating element coupled to the support element;

a flange independent of the support element and coupled to the heating element, the flange abutting an inner surface of the faceplate and configured to heat the space between the rotatable mount and the outer surface of the faceplate;

a control thermostat configured to receive a temperature input and allow current to flow through the heating element at or below a first temperature and reduce current flow through the heating element at or above a second temperature.

2. The angle of attack sensor of claim 1, wherein the support element comprises a metal collar.

3. The angle of attack sensor of claim 1, wherein a portion of the heating element is disposed on a portion of the flange.

4. The angle of attack sensor of claim 1, wherein the support element comprises a hinge to allow a first end of the support element to be rotated from a second end of the support element.

5. The angle of attack sensor of claim 1, wherein the support element is sized to allow a space between a first end of the support element and a second end of the support element to indicate a proper installation of the support element.

6. The angle of attack sensor of claim 5, further comprising a fastener for releasably affixing the first end of the support element to the second end of the support element.

7. The angle of attack sensor of claim 1, further comprising a polyimide bond between the support element and the heating element to directly bond the support element to the heating element.

8. The angle of attack sensor of claim 1, wherein the heating element is comprised of one or more of polyacetylene, polypyrrole, polyaniline, and p-phenylene vinylene, or copolymers of polyacetylene, polypyrrole, polyaniline, and p-phenylene vinylene.

9. The angle of attack sensor of claim 1, wherein the heating element comprises metal.

10. An angle of attack sensor system for an aircraft, comprising:

an angle of attack sensor comprising:

an airfoil-shaped body affixed to a rotatable mount;

a casing defining an inner volume; and a faceplate extending over the outer casing and configured to partially receive the rotatable mount, wherein a space is defined between the rotatable mount and an outer surface of the faceplate; and a heating apparatus disposed in the inner volume of the outer casing and configured to reduce ice formation in the space between the rotatable mount and the outer surface of the faceplate, the heating apparatus comprising:

a support element configured for releasable engagement with outer casing of the angle of attack sensor, a heating element bonded to the support element to form a composite structure, a flange independent of the support element and coupled to the heating element, the flange abutting an inner surface of the faceplate, and a control thermostat configured to receive a temperature input and allow current to flow through the heating element at or below a first temperature and reduce current flow through the heating element at or above a second temperature.

11. The angle of attack sensor system of claim 10, wherein the support element comprises a metal collar.

12. The angle of attack sensor of system claim 10, wherein the support element comprises a hinge to allow a first end of the support element to be rotated from a second end of the support element.

13. The angle of attack sensor system of claim 12, further comprising a fastener for releasably affixing the first end of the support element to the second end of the support element.

14. The angle of attack sensor system of claim 10, further comprising a polyimide bond between the support element and the heating element to directly bond the support element to the heating element.

15. The angle of attack sensor system of claim 10, wherein the heating element is comprised of one or more of polyacetylene, polypyrrole, polyaniline, and p-phenylene vinylene, or copolymers of polyacetylene, polypyrrole, polyaniline, and p-phenylene vinylene.

16. The angle of attack sensor system of claim 10, further comprising insulation to reduce an amount of heat lost from the heating apparatus to the environment, wherein the insulation comprises a heat reflective metal, ceramic, glass fiber sheet/matting, silica, mica, glass wool, asbestos, silk wool, or thermally insulative polymers.

17. The angle of attack sensor of claim 1, in which the flange comprises a lateral portion aligned with the support element and a radial portion extending radially past the support element, the lateral and radial portions of the flange defining a heat transfer surface area abutting the inner surface of the faceplate.

18. The angle of attack sensor system of claim 10, in which the flange comprises a lateral portion aligned with the support element and a radial portion extending radially past the support element, the lateral and radial portions of the flange defining a heat transfer surface area abutting the inner surface of the faceplate.

* * * * *